United States Patent Office 2,997,495
Patented Aug. 22, 1961

2,997,495
PREPARATION OF VINYL ESTERS
Thomas F. Rutledge, Madison, Alio J. Buselli, New Providence, and Ralph McNabney, Morristown, N.J., assignors to Air Reduction Company, Incorporated, New York, N.Y., a corporation of New York
Filed Aug. 27, 1956, Ser. No. 606,515
14 Claims. (Cl. 260—410.9)

This invention relates to a novel method of preparing vinyl esters by a vinyl interchange or transvinylation reaction between a vinyl ester reactant and a carboxylic acid in the presence of a vinyl interchange catalyst to form the corresponding vinyl ester of the carboxylic acid together with the corresponding by-product acid of the vinyl ester reactant. The invention includes the improvement of removing the by-product acid of the vinyl ester reactant formed during the reaction. The invention also includes the use of an improved vinyl interchange catalyst for producing vinyl esters of aliphatic monocarboxylic acids by vinyl interchange reaction. The invention further includes an improved method of purifying crude vinyl ester products as well as an improved over-all method for producing vinyl esters by vinyl interchange reaction.

The production of vinyl esters by a vinyl interchange reaction involves the reaction between a carboxylic acid and a vinyl ester reactant or transvinylation agent in the presence of a vinyl interchange catalyst. The reaction results in the production of the corresponding vinyl ester of the carboxylic acid and, in addition, the corresponding acid of the vinyl ester reactant. For example, when vinyl acetate is used as a vinyl ester reactant, the corresponding by-product acid formed would be acetic acid. The vinyl interchange reaction may be represented by the following equation, illustrating the use of vinyl acetate as a vinyl ester reactant and stearic acid as the carboxylic acid reactant:

$$CH_3COOCH=CH_2 + C_{17}H_{35}COOH \underset{heat}{\overset{catalyst}{\rightleftarrows}}$$
$$C_{17}H_{35}COOCH=CH_2 + CH_3COOH$$

Generally, the vinyl interchange reaction can be carried out batch-wise or advantageously in a continuous process, but in each case the reaction involves the heating of a mixture of a carboxylic acid and a vinyl ester reactant in the presence of a vinyl interchange catalyst to form the vinyl ester product and the corresponding by-product acid of the vinyl ester reactant.

We have found that the vinyl interchange reaction between a carboxylic acid and a vinyl ester reactant can be considerably improved by removing the vinyl ester reactant by-product acid from the reaction medium. By removing the by-product acid, the equilibrium of the reaction is shifted in the direction favoring the formation of the vinyl ester product and considerably improves the yield and quality of the vinyl ester product. We have consistently obtained yields of vinyl esters by the process of this invention in excess of 85 percent, and in some instances, in excess of 95 percent. The removal of the by-product acid also simplifies the isolation and purification of the crude vinyl ester product and generally improves the over-all process of this invention. The removal of the by-product acid also considerably reduces the formation of other undesirable by-products or impurities, such as ethylidene diesters, which are very difficult to remove from the vinyl ester products. The presence of such impurities in the final product has also been found to hinder the polymerization properties of the vinyl esters.

We have found that the by-product acid can be removed from the reaction medium in an advantageous manner by entrainment in the vapor of the vinyl ester reactant. Entrainment is a physical phenomenon which involves the mixing of two or more vapors. For example, when vinyl acetate is used as a vinyl ester reactant, acetic acid is formed as the by-product acid as the reaction progresses. Due to the appreciable vapor pressure of the formed acetic acid at the reaction temperature, acetic acid vapor is formed in the reaction mixture. When another vapor, such as vinyl acetate vapor is passed through the reaction mixture, the acetic acid vapor present becomes entrained in the vinyl acetate vapor and removed from the reaction mixture along with the vinyl acetate vapor. As the acetic acid vapor is removed more acetic acid vapor is formed as the acetic acid liquid-vapor phases return to equilibrium. Continued passage of the vinyl acetate vapor through the reaction mixtures continuously entrains the acetic acid vapor, removes it from the reaction mixture upsetting the acetic acid liquid-vapor equilibrium and forcing more acetic acid into the vapor phase to be removed therefrom by continued passage of vinyl acetate vapor therethrough. The same entrainment principle applies when the other reactants as herein disclosed are reacted.

The by-product acid can be entrained in different manners. For example, the vinyl ester reactant can be rapidly distilled from the reaction mixture by maintaining the reaction mixture at the distillation temperature of the vinyl ester reactant while fresh vinyl ester reactant is simultaneously added to the reaction to maintain the correct level or proportions of the reactants. The vinyl ester reactant vapor formed by reason of the distillation entrains or entraps the by-product acid. The vinyl ester vapor, together with the by-product acid entrained therein, is then removed from the reaction vessel or medium. The vinyl ester vapor can then be condensed and separated from the by-product acid, rendering the vinyl ester reactant suitable for reuse or recycle.

We have found, however, that a particularly advantageous entrainment and removal of the by-product acid can be accomplished by passing the vapor of the vinyl ester reactant directly through the reaction mixture. The vinyl ester reactant vapor can be passed through the reaction mixture in various manners. For example, the reaction vessel can be the ordinary 3-necked flask having one end of a tube inserted therein and ending near the bottom of the flask, and the other end connected to a separate vinyl ester reactant still pot. The vinyl ester vapor is formed in the still pot, passed through the tube, bubbled up through the reaction mixture entraining the by-product acid, and passed out through another neck in the flask to subsequent vinyl ester reactant recovery.

The vinyl ester vapor containing the by-product acid should be removed from the reaction vessel by means of a vapor path which is sufficiently short, or so designed, to prevent reflux or fractionation of the entrained by-product acid in the vinyl ester vapor. Fractionation or reflux occurring in the vapor path causes return of the by-product acid to the reaction mixture and results in poor removal of the by-product acid therefrom. A type of apparatus suitable for removing the vapors without fractionation or reflux can consist of a reaction vessel fitted with a short wide tube bent at a greater than 90° angle so that the tube slopes slightly downward and away from the reaction vessel. Part of the sloping portion of the tube can be jacketed so that cold water can be circulated around it to condense the vapors and the condensate led to a suitable receiver.

Figure 1:
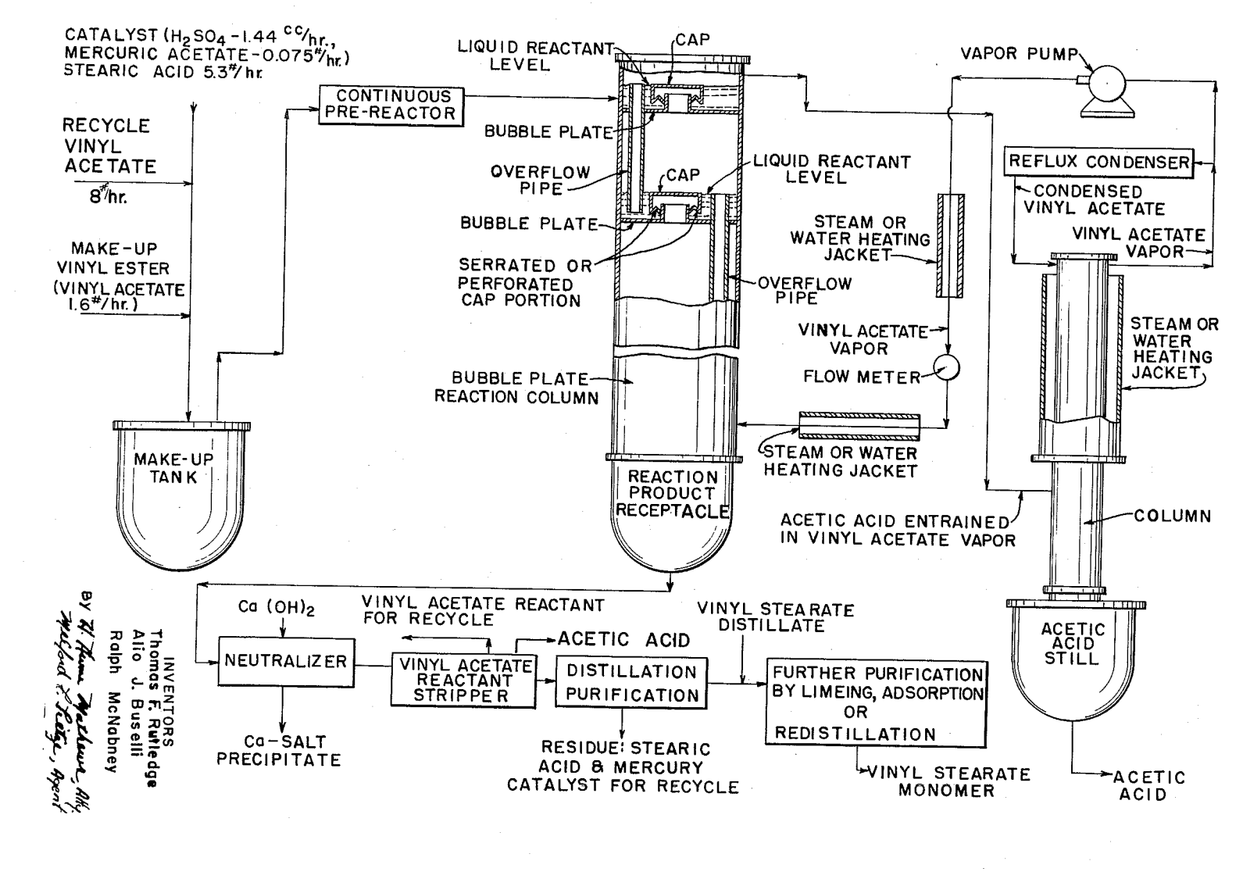

We have further found that an entrainment method such as that illustrated in the drawing is a particularly effective method. This method involves the passing of the reactants through a reaction column of the type shown in the drawing, which consists of a modified bubble plate distillation column. The reaction mixture enters the top of the column, as shown, and fills the first plate to the level of the over-flow pipe. It then flows through the over-flow pipe into the second plate until it is filled to the level of the over-flow pipe of the second plate, and so on through the entire series of plates in the column. At the same time as the reaction mixture is being flowed through the column, vinyl ester reactant vapor is fed to the bottom of the column and travels upwardly through the serrated or perforated portions of the bubble plate caps, as shown in the drawing. The vinyl ester reactant vapor is thus very efficiently bubbled through the reaction mixture resulting in excellent entraining of the by-product acid. The entrained acid is then removed from the top of the column and sent to vinyl ester recovery as shown in the drawing.

The number of plates in the reaction column can be varied considerably and will depend in part on the height of the liquid reactants permitted to collect in each plate. We have found that about a 15- to 16-plate column is advantageous, where the depth of the liquid reactants is maintained at about 2–3 inches. In this instance the length of the reaction column can be about 30 feet and the diameter between 6 and 8 inches.

In passing the vinyl ester reactant vapor through the reaction mixture under the conditions herein set forth, the vinyl ester reactant level, or the proportion thereof to the carboxylic acid, is readily maintained due to condensation of the vinyl ester reactant vapor in the reaction vessel or column.

The removal of the by-product acid by entraining it in the vinyl ester reactant vapor passed or swept through the reaction mixture has many advantages, including very efficient removal of the by-product acid, reduced heat input to the reaction, improved agitation, the elimination of foaming of the reaction mixture, and also the elimination of build-up of vinyl ester reactant stabilizers such as the hydroquinone stabilizer commonly used to stabilize vinyl acetate.

Removal of all of the by-product acid is, of course, advantageous. We have found that the advantages of removing the by-product acid can be obtained by removing as little as 45 percent of the theoretical quantity of the by-product acid formed. It is preferred, however, to remove at least about 60 percent and above of the theoretical quantity of the by-product acid formed.

Other entrainment vapors can also be advantageously used with the vinyl ester reactant vapor to aid in entraining the by-product acid, such as n-heptane and cyclohexane.

Various vinyl ester reactants or transvinylation agents can be used to transvinylate the carboxylic acids in place of the vinyl acetate used in the above equation according to this invention, including vinyl propionate, vinyl butyrate, vinyl valerate, vinyl hexoate, and the like. When using different vinyl ester reactants, the corresponding acid of the vinyl ester reactant will be formed as the by-product acid during the reaction. We have found that particularly effective results are obtained when vinyl acetate is used as a transvinylation agent. Vinyl acetate forms acetic acid as a by-product acid, and we have found that acetic acid can be readily and easily removed from the reaction medium by entrainment in vinyl acetate vapor at a temperature sufficiently low to prevent degradation or polymer formation in the reaction mixture. Acetic acid entrained in vinyl acetate vapor is also easily recovered therefrom in pure form, permitting efficient recovery and recycle of pure vinyl acetate vapor to the reaction mixture to entrain and remove additional acetic acid. The use of esters of higher molecular weight than vinyl acetate generally require the use of higher reaction temperatures, and, in some instances, reduced pressures may be necessary to maintain low reaction temperatures to prevent degradation and polymer formation in the reaction mixture.

Various carboxylic acids can be reacted with the vinyl ester reactants according to this invention to form the corresponding vinyl esters of the carboxylic acids used as reactants. Some specific examples of carboxylic acids which can be used include aliphatic and monocyclic monocarboxylic acids such as cyclohexane carboxylic, stearic, myristic, palmitic, hexadecanoic, oleic, linoleic, caproic, capric, pelargonic and linolenic; aliphatic dicarboxylic acids such as adipic, sebacic and azelaic to form the corresponding divinyl esters; aromatic carboxylic acids such as benzoic, naphthoic, anthranoic and toluic; half-esters of aliphatic dicarboxylic acids such as methyl acid succinate and butyl acid succinate, and of aromatic dicarboxylic acids such as methyl acid phthalate.

The mol ratio of the vinylester reactant to the carboxylic acid reactant can be varied over a fairly wide range depending in part upon the particular carboxylic acid being reacted. When a monocarboxylic acid is being reacted with a vinyl ester reactant, it is desirable to use an excess of the vinyl ester reactant and we have found that it is advantageous to use about 6 mols of the vinyl ester reactant to 1 mol of the monocarboxylic acid. More vinyl ester could be used if desired, but there is no apparent advantage in doing so. Less vinyl ester could also be used, but when the amount is decreased below about 3 mols of vinyl ester reactant to 1 mol of monocarboxylic acid, the yield of the corresponding vinyl ester is also correspondingly reduced. Ordinarily since the advantageous ratio of vinyl ester reactant to a monocarboxylic acid is about 6 mols of the vinyl ester reactant to 1 mol of the monocarboxylic acid, it would seem to follow that when a dicarboxylic acid is being reacted that twice the amount of vinyl ester reactant would also be advantageous since the number of carboxyl groups have been doubled. We have found, however, that it is advantageous to use slightly less vinyl ester reactant than twice the amount that would be advantageously used with monocarboxylic acid. For example, we have found that by using a mol ratio of about 9.4 mols of vinyl ester reactant to 1 mol of a dicarboxylic acid that the yield of the corresponding vinyl ester is increased and the resulting vinyl ester product is of improved quality and purity.

Various catalysts can be used to promote the vinyl interchange reaction of this invention. We have found that the mercury salt-strong acid catalysts are most effective and, especially, the mercury salt-sulfuric acid catalysts. Various mercury compounds can be used in conjunction with the acids including mercuric oxide, mercuric acetate and mercuric stearate. Other acids which can be used in conjunction with the mercury compounds besides sulfuric acid include phosphoric, p-toluene sulfonic and trifluoroacetic acids. The sulfuric acid used in the examples below is commercial sulfuric acid of about 96% purity having a density of 1.84. The mol ratios set forth below have been corrected and represent the mol ratio of pure sulfuric acid.

In general, various amounts of the mercury salt-acid catalysts can be used to promote the vinyl interchange reaction according to this invention. The amount of catalyst which can be used will depend in part upon the particular carboxylic acid being reacted. For example, in reacting a dicarboxylic acid such as azelaic acid with a vinyl acetate reactant, we have found that it is advantageous to use about 0.0244 mol mercury compound per mol of azelaic acid together with about 0.0039 mol of sulfuric acid per mol of azelaic acid. The amount of mercury catalyst can be safely varied within a fairly wide range and the amount of sulfuric acid per mol of azelaic acid can safely be varied between 0.0028 to 0.0035 mol. With benzoic acid, we have found that 0.0126 mol of mercury catalyst per mol of benzoic acid is desirable, but have found that the use of about 0.0037 mol of sulfuric acid per mol of benzoic acid is the most advantageous concentration of the acid. The selection of the amount of mercury and acid used as a catalyst with acids other than aliphatic monocarboxylic acids, is a matter of choosing an amount of catalyst in a proper ratio to give an acceptable rate of reaction and yet not too much so as to be wasteful.

We have also found a particularly effective and advantageous catalyst range to promote the reaction between aliphatic monocarboxylic acids and a vinyl ester reactant. We have found that in order to successfully produce aliphatic monocarboxylic acids on a commercial basis giving increased yields, permitting reuse or recycle of the catalyst, and to produce a satisfactory monomer grade product that the total acid content must be held below a certain concentration. When using sulfuric acid as the acid catalyst the range which can effectively be used with aliphatic monocarboxylic acids is below about 0.0046 mol of sulfuric acid per mol of aliphatic monocarboxylic acids. Expressed in other terms, the effective range would be below about 0.156 gram of sulfuric acid per 100 grams of aliphatic monocarboxylic acid. This may vary slightly when different acids are used. If an acid is used other than sulfuric acid, it should be used in an equivalent amount to the range set forth above for sulfuric acid. The mols of sulfuric acid per mol of aliphatic monocarboxylic acid used should also not be lower than about 0.0031 mol of acid or else the reaction rate or yield begins to fall off fairly rapidly. It is more important, however, to maintain the concentration of the sulfuric acid below about 0.0039 mol per mol of aliphatic monocarboxylic acid. The use of an amount of sulfuric acid in excess of the amount given above results in the formation of a cloudy or milky, gummy reaction product. The higher the amount of acid the worse the reaction mixture. Such a product is very difficult to filter and is otherwise unmanageable. The impurities formed causing the gummy product are believed to be polymers. In any event, these impurities also adsorb significant quantities of the mercury catalyst which is difficult to recover and prohibits direct recovery and recycling of the mercury catalysts.

The acid catalysts' range as disclosed above is particularly advantageous only when using the method of this invention wherein the by-product acid is removed from the reaction mixture and when the carboxylic acid reactant is an aliphatic monocarboxylic acid. In a straight low yield vinyl interchange reaction from which the by-product acid is not removed, no advantages are gained by maintaining the amount of acid below the range herein disclosed.

The amount of mercury compound catalysts which can be used in conjunction with the sulfuric acid to promote the reaction between a vinyl ester reactant and an aliphatic monocarboxylic acid is also important but can be more widely varied. Generally, the use of too little mercury compound slows down the reaction and it is desirable to use a sufficient amount of mercury to permit the reaction to proceed at a reasonable rate. The use of too much mercury, in excess of about 10 percent of 0.012 mol of mercury per mol of monocarboxylic acid does not significantly improve the reaction but can cause some polymer formation during the subsequent treatment and purification of the vinyl ester reaction product. We have also found that the mercury compound-sulfuric acid ratio can vary between about 1:0.27 to 1:0.30 and that the best ratio is 1:0.28.

This invention also includes the pre-reacting of the vinyl ester reactant and the carboxylic acid before beginning the removal of the by-product acid from the reaction mixture. By pre-reacting, the reaction is allowed to proceed well toward equilibrium before beginning the by-product acid removal. Generally, when the reaction mixture has proceeded to substantial equilibrium, the by-product acid is present in about 8 to 10% when monocarboxylic acids are being reacted. The pre-reaction can be accomplished in various manners, such as by mildly refluxing the reaction mixture as will be apparent to those skilled in the art. Generally, refluxing the reaction mixture between 45 and 60 minutes is sufficient to bring the reaction to equilibrium.

Pre-reacting the reactants prior to beginning the by-product acid removal makes possible more efficient removal of the by-product acid with the use of less vinyl ester reactant vapor and the entire over-all method is improved and requires considerably less time.

After the reactants have been pre-reacted, if this is the procedure adopted, entrainment of the by-product acid is begun. The reaction is continued during the entrainment at a temperature just at the boiling point of the reaction mixture until it is substantially complete.

The reaction temperature can be varied somewhat depending upon a number of variables such as the particular vinyl ester used and the method of removing the by-product acid. Generally, we have found that it is advantageous to carry out the reaction exactly at the reflux or boiling temperature of the reaction mixture. At this temperature, the by-product acid has an appreciable vapor pressure and condensation of the vinyl ester reactant vapor used to entrain the by-product acid is prevented. The pre-reaction temperature is advantageously maintained just short of the reflux temperature of the reaction mixture or at a very mild reflux. For example, when reacting vinyl acetate and stearic acid, we have used reaction temperatures between 75° C. to 85° C., but have found a reaction temperature between about 78° C. to 80° C. to be advantageous.

The product resulting after the vinyl interchange reaction has been completed contains in addition to the vinyl ester product, the reactive catalyst, unreacted vinyl ester reactant, and unreacted carboxylic acid together with other more minor impurities. Since most of the by-product acid was removed during the reaction, very little, if any, is present in the final crude reaction product.

The reaction product, or sulfuric acid present in the crude reaction product, is then neutralized by adding a sufficient amount of neutralizing agent to the crude product. Various neutralizing agents can be used, including sodium acetate trihydrate, magnesium silicate, magnesium oxide, calcium acetate and calcium hydroxide. The amount of neutralizing agent necessary to neutralize the reaction mixture will depend mostly upon the amount of acid catalyst utilized to promote the vinyl interchange reaction. The amount necessary can readily be calculated by those skilled in the art although it is desirable to use an excess. The amounts of neutralizing agents necessary to neutralize the reaction mixture under specific conditions are set forth in the specific examples given below. Calcium hydroxide is a particularly advantageous neutralizing agent and is quite superior to other neutralizing agents as disclosed in the copending United States patent application of Charles Brown, Serial No. 606,212, filed August 27, 1956 and assigned to the same assignee as the present invention.

The neutralization of the active catalysts is important and should be done as soon as possible to prevent undesirable effects which might result from the presence of the catalyst in the reaction product, such as polymerization, decomposition, excessive color formation and the like during the removal of the unreacted vinyl ester reactant or by other subsequent stripping and purification treatments.

The unreacted vinyl ester reactant, and any by-product acid remaining, is stripped from the reaction product. The stripping of the vinyl ester reactant should be carefully controlled to prevent degradation or polymerization of the remaining components in the reaction mixture. We have found that the removal or stripping of the vinyl ester reactant can be effectively carried out under vacuum. For example, when the vinyl ester reactant is vinyl acetate, the vinyl acetate can be stripped from the reaction product by distillation by placing the reaction product in a short-path distillation apparatus and heating it until the temperature reaches about 25–35° C. and a vacuum applied when this temperature is reached. The vacuum can be applied by means of a vacuum pump and the pressure gradually lowered so that the mixture boils rapidly without splashing or foaming. As the pressure is gradually lowered to about 1–2 mm., the reaction product can be heated further and the heating and vacuum continued until all of the vinyl acetate and other volatile impurities have been removed. Any by-product acid present which was not removed by entrainment is removed from the reaction product during the removal of the vinyl ester reactant. Other methods can, of course, be used to strip the vinyl ester reactant from the reaction product, and with the use of other vinyl ester reactants besides vinyl acetate other stripping conditions will have to be used, as will be apparent to those skilled in the art.

The crude reaction product, after the vinyl ester reactant has been removed contains mainly the vinyl ester of the carboxylic acid reactant, unreacted carboxylic acid and the catalyst together with some additional small amounts of other impurities.

The crude vinyl ester of the carboxylic acid reactant is then purified, by distillation, for example. The temperatures and the conditions of the distillation will, of course, vary depending upon the particular vinyl ester reaction product produced. Some specific distillation conditions for various vinyl ester products are given in the specific examples set forth below.

After the crude vinyl ester of the carboxylic acid reactant has been purified by distillation, the residue contains part of the original mercury salt catalysts together with most of the unreacted carboxylic acid.

The vinyl ester product can be further purified in different manners. For example, the vinyl ester product may be re-distilled. We have found that the vinyl ester product can advantageously be further purified by dissolving it in a hydrocarbon solvent such as pentane and liming the solution. For example, the partially purified vinyl ester reaction product can be dissolved in a hydrocarbon such as heptane, hexane, or pentane, calcium hydroxide and water added, agitated, and the mixture filtered from the insolubles. The amount of calcium hydroxide used can be varied, but we have found that the use of about 3% of calcium hydroxide based on the weight of the crude vinyl ester product and about 1.5% water based on the weight of the crude vinyl product is advantageous. The hydrocarbon solution of the vinyl ester product together with the calcium hydroxide and water is preferably agitated by stirring for about an hour at room temperature and the mixture then filtered, and the hydrocarbon then distilled from the reaction product. Generally, most of the hydrocarbon solvent can be distilled from the vinyl ester reaction product at atmospheric pressure at a temperature of about 80° C. The remaining hydrocarbon can be removed gradually under reduced pressure. The vinyl ester product can then be re-distilled if necessary, or desirable, to further purify it.

We have found that even with carefully controlled purification of the vinyl ester products by distillation, redistillation, liming, etc., that the vinyl ester products still generally contain a noticeable amount of impurities which are readily apparent from the physical properties such as color and odor and also from the polymerization properties of the product. We have found a very effective and simple method of further purifying the vinyl ester product to a colorless, clean product which possesses excellent polymerization properties, by contacting the vinyl ester product with a series of adsorbents comprising a magnesium oxide, a magnesium silicate and an activated carbon. Various other types of equivalent adsorbents can also be used, but we have found that a neutral activated carbon marketed by the West Virginia Pulp and Paper Company under the trade name "Nuchar C-190-N," a hydrous magnesium silicate marketed by the Westvaco Chemical Company under the trade name "Magnesol," and a magnesium oxide marketed by Westvaco Mineral Products Division of the Westvaco Chemical Company under the trade name "Sea Sorb" are advantageous adsorbents. The three adsorbents can be used in different orders, but we have found that more effective results are obtained by first contacting the vinyl ester product with magnesium oxide, then magnesium silicate, and lastly activated carbon. Where liming is just done the magnesium oxide may sometime be omitted.

The adsorbents can be added to a hydrocarbon solution, such as a pentane solution, of the vinyl ester product and stirred for about an hour in a batch-type operation, the adsorbents filtered off and the hydrocarbon distilled from the vinyl ester product. Dissolving the vinyl ester product in a hydrocarbon solvent may not be necessary if it is a liquid, in which case it can be directly contacted with the adsorbents. The vinyl ester product can also be contacted with the adsorbents while it is in the molten state if it is a solid. Although a pure monomer grade vinyl ester product can be obtained in these manners, we have found that it is more advantageous from a method standpoint to place the adsorbents in an adsorption column and pass the hydrocarbon solution of the vinyl ester product through the adsorption column. It is advantageous to place the adsorbents in the adsorption column in the form of a hydrocarbon slurry of the same hydrocarbon as was used to dissolve vinyl ester product.

The amounts of adsorbents used, will, of course, vary depending upon the amount of vinyl ester product to be purified, the rate at which the vinyl ester product is passed through the column, etc. In any event, the amount of adsorbents and the rate of flow through the column should be adjusted so that the vinyl ester product leaving the column contains a purer monomer grade vinyl ester. We have found that it is advantageous to use about equal quantities of magnesium silicate and magnesium oxide, and activated carbon in a quantity amounting to about one-fifth of the magnesium silicate or the magnesium oxide. We have also found that for about every 200 grams of vinyl ester to be purified that it is advantageous to use about 20 grams of magnesium silicate, 20 grams of magnesium oxide, and about 4 grams of activated carbon.

The distilled or partly purified vinyl ester product before being treated with the adsorbents generally contains small amounts of unreacted carboxylic acids, mercury, and other impurities, in addition to small amounts of coloring matter. In contacting the vinyl ester product first with a magnesium oxide, the remaining unreacted carboxylic acid is removed plus a small amount of the mercury and color. The magnesium silicate removes most of the mercury and any remaining unreacted carboxylic acid in addition to other unknown impurities. The magnesium silicate as noted above, also removes the carboxylic acid reactant, and it is thus advantageous to first contact the vinyl ester product with the magnesium oxide to first remove most of the carboxylic acid and thus save the adsorptive power of the magnesium silicate for the removal of most of the mercury and other unknown impurities which the magnesium oxide will not effectively remove. The vinyl ester product is then contacted by the activated carbon which removes the remaining color and a little of the mercury which may remain. The use of the combination of adsorbents noticeably aids in the production of a monomer grade vinyl ester product free from inhibitors and having an improved polymerization properties. The use of the adsorbents as disclosed herein are particularly advantageous since most of the carboxylic acids can be recovered therefrom in significant quantities and also most of the vinyl ester product can be recovered.

The accompanying drawing is a flow sheet illustrating a particular process and particular types of apparatus which can advantageously be used according to this invention. The method disclosed in the drawing is related to a specific reaction between vinyl acetate, stearic acid, with a mercury acetate-sulfuric acid catalyst for the purposes of describing and setting forth a specific example of a continuous method and to illustrate specific rates of feed and vinyl ester reactant recycle for a particular system in a continuous method. Other reactants and catalysts can be similarly reacted as described herein as will be apparent to those skilled in the art.

As shown in the drawing, the reactants and catalyst are continuously fed into a make-up tank. The rate of feed as shown is 5.3 pounds of stearic acid per hour and a total of 9.6 pounds of vinyl acetate reactant per hour. This forms a mol ratio of vinyl acetate to stearic acid of about 6 to 1. The mercuric acetate is fed into the make-up tank at 0.075 pound per hour and the concentrated sulfuric acid at 1.44 ml. per hour. The amount of sulfuric acid being fed amounts to about 0.0024 for every mol of the stearic acid feed.

The feed forms a slurry in the make-up tank at room temperature. The reaction slurry can be heated in the make-up tank to bring the components of the reaction slurry into solution or the reaction slurry can be passed through a heat exchanger, not shown in the drawing, to accomplish the same purpose.

From the make-up tank or heat exchanger the reaction mixture is fed to a continuous pre-reactor in which vinyl interchanged reaction mixture is pre-reacted and is carried to substantial equilibrium. The continuous pre-reactor can be of similar construction to known continuous reactors. The pre-reactor can be fitted with a water or steam jacket, not shown in the drawing, for supplying heat to promote the reaction and constructed to prevent back circulation. This can be accomplished by placing baffles in the pre-reactor tube or by regulating the length and diameter.

The pre-reactor is maintained at a temperature just at the boiling temperature of the reaction mixture or at a mild reflux temperature. The time that the reaction mixture takes to pass through the pre-reactor tube will, of course, depend upon many variables such as the length and diameter of the tube, rate of flow therethrough and the temperature. The size of the pre-reactor tube, rate of flow and other variables should be so regulated that the reaction mixture exiting from the continuous pre-reactor is approximately at equilibrium. We have found that the time necessary to bring the reaction mixture to substantial equilibrium is generally between 45 and 60 minutes, when the reaction temperature is maintained at mild reflux temperature. To maintain the reaction mixture at the reaction temperature in the pre-reactor for the required period of time to bring it to substantial equilibrium, a pre-reactor tube of about 3 feet in length and about 4 to 6 inches in diameter is advantageous and the rate of flow so adjusted to exit the reaction mixture approximately at equilibrium. The vinyl stearate reaction mixture at substantial equilibrium generally contains between about 8% by-product acid, which, in the process illustrated in the drawings, would be acetic acid.

The vinyl stearate reaction mixture is then fed to the top of a bubble plate reaction column and flowed over the bubble plates down through the column at the same time that vinyl acetate vapor is fed to the bottom of the column. As disclosed in more detail above, the vinyl ester vapor passes through the reaction mixture by means of the slotted bubble plate caps, entraining the by-product acid and removing it from the reaction mixture to permit the reaction to progress towards the formation of vinyl stearate. The vinyl acetate vapor having the by-product acid entrained therein is removed from the top of the reaction column and fed to vinyl acetate recovery, for recycling to the bottom of the reaction column.

The length, diameter, rate of flow of the reaction mixture and the number and construction of the bubble plates are so regulated that when the vinyl stearate reaction mixture reaches the bottom of the reaction tower and enters the reaction product receptacle, it is substantially free from acetic acid as explained above.

The rate of flow of the reaction mixture through the pre-reactor and the reaction column is advantageously the same rate as the reaction mixture feed to the make-up tank. Under the conditions set forth above and in the drawing, the time of the pre-reaction is about 1 hour and the time the reaction mixture remains in the reaction column is about 2 hours.

The vinyl stearate reaction product is then transferred to a neutralizing vessel where it is neutralized with a neutralizing agent such as disclosed above, and separated from any salts resulting from the neutralization as disclosed above in more detail.

The vinyl acetate and other low boiling components such as any remaining acetic acid, are then stripped from the reaction product by distillation and the vinyl acetate recycled.

The reaction product is then transferred to a short-path distillation column where it is distilled in the manner disclosed in the specific examples.

The distillation residue contains most of the mercury catalyst and some unreacted stearic acid and is recycled to the original make-up for continuing the reaction. Any loss of mercury catalyst can be made up by adding additional mercury to the recycled mercury. Generally, it is not necessary to add more than 10–15% mercury salt to make up that lost during the reaction and purification.

The vinyl acetate vapors which are bubbled through the reaction mixture entraining the by-product acetic acid can be recovered from the by-product acetic acid in various ways. For example, the by-product acid can be adsorbed by a selective adsorbent. An example of a selective adsorbent when acetic acid is the by-product acid and is to be separated from vinyl acetate is finely divided magnesium oxide such as that marketed by the Westvaco Mineral Products Division of the Westvaco Chemical Company under the trade name "Sea Sorb." The magnesium oxide readily adsorbs the acetic acid and passes through pure vinyl acetate suitable for reuse or recycle. An adsorption column containing the magnesium oxide can be used and the amount of magnesium oxide and the length of the column required can readily be determined by standard tests of the existing vinyl acetate.

The particular process shown in the drawing is very advantageous and involves transferring the vinyl ester vapors together with the entrained by-product acid to a distillation column maintained at a temperature below the boiling point of the by-product acetic acid, but above that of vinyl acetate. The vinyl acetate vapor comes off the top of the column and is split into two portions, one portion is condensed and returned to the top of the column and the other recycled to the bottom of the reaction column. The column is best operated adiabatically and the recycled vinyl acetate vapor is superheated sufficiently to control the amount of vinyl acetate liquid reactant in the lower portion of the reactor. Advantageously the liquid vinyl acetate entering and leaving the column are the same. The rate of feed or recycle vinyl acetate to the bottom of the reaction column is about 10 cubic feet per minute. The vinyl acetate vapor is fed into the reaction column under about 6" of mercury at about 175° F.

The present invention provides a novel, effective and advantageous process for producing pure, monomer grade vinyl esters in consistently high yields of 85% and above. The vinyl esters produced according to this invention are superior in both physical and chemical properties to vinyl esters produced by other processes. The vinyl esters are easily polymerized and form excellent polymers. The various novel individual steps of the process of this invention can be co-operatively incorporated in a continuous large scale process resulting in a more efficient, more economical, simplified process for the production of high purity vinyl esters in higher yield than was heretofore possible.

The reaction vessel used in the examples given below consisted of a one-liter reaction flask connected to a condenser and calibrated receiver through a short, wide tube bent at an angle slightly greater than 90°. The reactor flask was also connected to a one-liter vinyl ester reactant still pot by means of a U-shaped tube through which the vinyl ester reactant vapors passed from the still pot to the reaction flask. The U-shaped tube was extended well into the reaction flask so as to insure the introduction of the vinyl ester reactant vapors well below the surface of the reaction mixture. The still pot was fitted with a dropping funnel so the vinyl ester reactant could be continuously added to the still pot to maintain the desired level of vinyl ester reactant during distillation. Clamped ball joint connections were used to provide a leak proof system. A nitrogen atmosphere was maintained in the system during the runs, and preparatory to each run, the still pot and reaction flask were thoroughly dried by heating and purging with nitrogen.

EXAMPLE I

Divinyl sebacate 390 ml. (4.2 moles) of vinyl acetate and 1.4 g. (0.004 mole) of mercuric acetate were placed in the reaction flask. The mixture was rapidly stirred and 0.07 ml. (0.0012 mole) of sulfuric acid was added to the mixture while stirring, one drop at a time. 70.7 g. (0.35 mole) of sebacic acid was then added to the reaction vessel. The reaction mixture was then refluxed gently for 2 hours. At the end of the 2 hours, vinyl acetate was distilled from the separate still pot and the vinyl acetate vapor passed through the reaction mixture at such a rate that 500 ml. of distillate was collected approximately every 20 minutes. The vinyl acetate vapor was passed through the reaction mixture for a period of 3 hours, during which time the reaction mixture was maintained at a temperature just at its boiling point. The course of the reaction was followed by titrating the acetic acid in cuts taken from the distillate. The total acetic acid removed was 36.08 g. After the 3-hour entrainment period, the reaction mixture was held at reflux for ½ hour.

The reaction product was then neutralized with a slurry of 0.8 g. of calcium hydroxide in 5 ml. of vinyl acetate. During the neutralization, the reaction product was continuously stirred for ½ hour and also heated to maintain the reaction product hot (about 60° C.). 3 g. of diatomaceous earth, marketed by Johns-Manville under the trade name "Hyflo Super Cel," were added to the reaction product as a filter aid and the stirring continued for 2 minutes. The reaction product was then filtered through a coarse, sintered glass Buchner funnel and the residue washed with fresh vinyl acetate. The residue upon drying weighed 7 g. and contained 0.9 g. of the total mercury used in the original catalyst.

A small amount of hydroquinone was then added to the reaction product before solvent removal. The vinyl acetate solvent was removed from the reaction product by distillation using a short-path distillation column. The mixture was warmed by means of an oil bath to 35–40° C. Vacuum was then applied to the reaction product and the pressure gradually lowered at such a rate that the low boiling components distilled off smoothly and rapidly. The heating and lowering of the pressure was continued until the residue was finally heated for approximately 10 minutes in an oil bath of 100–110° C. at 1 mm. pressure. The total time for the solvent removal was approximately 2 hours.

The crude divinyl sebacate weighed 90 g. and was then purified by distilling it in a short-column distillation apparatus. The distillation was carried out by lowering the pressure to 1–2 mm. while maintaining the distillation temperature at 133° C. The final pot temperature at 1–2 mm. was 150° C. The distilled divinyl sebacate weighed 70.5 g., was over 97% pure, had an acid No. of 14.3, an iodine No. of 193 and contained less than 3% acid and no detectable mercury. The conversion was over 77% based on the starting sebacic acid.

The distillation residue weighed 16.5 g. and contained most of the original mercury catalyst together with about 17% sebacic acid. With the addition of 10% fresh makeup mercuric acetate catalyst, the distillation residue was suitable for recycle for a subsequent run.

Further purification of a part of the final divinyl sebacate (58 g.) was accomplished by placing it in a round bottom flask fitted with a stirrer and condenser along with 120 cc. of pentane. To the pentane solution, calcium hydroxide (3% of the weight of the crude ester) and water (1.5% of the weight of the crude ester) was added. This mixture was stirred for 1 hour at room temperature. The mixture was then filtered through a coarse, sintered glass Buchner funnel. The filter cake was washed with small portions of pentane. Most of the pentane was distilled off from the filtrate at atmospheric pressure at a pot temperature of 60° C. The remaining pentane was removed by gradually reducing the pressure. The divinyl sebacate was then subjected to a final distillation using a 16" Vigreux column. The recovered pure divinyl sebacate had a boiling point of 136–137° C. at 2.5 mm., an iodine No. of 198.6 and an acid No. of 14–15. The yield based on the sebacic acid consumed was 93.5%. The conversion based on the starting sebacic acid was 77%.

EXAMPLE 2

Vinyl benzoate

Vinyl benzoate was prepared by placing into the reaction vessel 390 ml. (4.2 moles) of vinyl acetate together with 2.8 g. of mercuric acetate. The mixture was stirred while adding 0.15 ml. of concentrated sulfuric acid, one drop at a time. 85.4 g. (0.7 mole) of benzoic acid was then added to the reaction mixture and the reaction mixture pre-reacted to substantial equilibrium by refluxing the reaction mixture for 1½ hours. Vinyl acetate was then distilled from the separate still pot and the vinyl acetate vapor passed through the reaction mixture at such a rate that 500 ml. of distillate was collected every 20 minutes to entrain and remove the acetic acid by-product. The entrainment with the vinyl acetate vapor was continued for 3 hours while maintaining the reaction mixture at a temperature just below its boiling point. The reaction mixture was then again refluxed for ½ hour.

The reaction product was then neutralized with 0.5 g. of calcium hydroxide in 5 ml. of vinyl acetate and filtered in the same manner as the reaction product was neutralized and filtered in Example 1.

The reaction product was then distilled to remove the solvent and the remaining acetic acid. In distilling the solvents and acetic acid from the reaction product, the still temperature was maintained below 50° C. and a minimum pressure of 10 mm. was used. The total time for solvent stripping was 1 hour. The acetic acid in the distillate was calculated at 3.9 g. The crude vinyl benzoate weighed 101.3 g.

The vinyl benzoate was then readily separated from the impurities by distilling it under reduced pressure (5 mm.) through a short Vigreux column. During the distillation, the still pot temperature at the beginning of the distillation was 80° C. and the final pot temperature 123° C. The distillate weighed 80 g. and was over 96% pure. The vinyl benzoate can be further purified either by redistillation or by dissolving it in pentane and stirring with a small quantity of calcium hydroxide and water in the same manner as set forth in the previous examples. The conversion to vinyl benzoate was calculated as 74.9% with a yield in excess of 90%.

The weight of the dark viscous residue was about 15.5 g. This residue contained most of the mercury and after adding 10% fresh makeup of mercuric acetate, the residue was suitable for recycle as active catalyst for another run.

EXAMPLE 3

*Methyl vinyl phthalate*

Methyl vinyl phthalate was prepared by placing into the reaction vessel 195 ml. (2.1 moles) of vinyl acetate together with 2.8 g. of mercuric acetate. The mixture was stirred rapidly and 0.13 ml. of concentrated sulfuric acid was added to the mixture, one drop at a time from a 1 ml. pipette. 126 g. (0.7 mole) of methyl acid phthalate containing 195 ml. (2.1 moles) of vinyl acetate was then added to the reaction vessel. The reaction mixture was refluxed gently for 1 hour. Vinyl acetate vapor distilled from a separate still pot was passed through the reaction mixture at such a rate that 500 ml. of distillate was collected approximately every 20 minutes. The vinyl acetate was passed through the mixture until eight 500 ml. cuts were taken. The course of the action was followed by titrating the acetic acid in each cut. The total acetic acid removed was approximately 31 g. The entrainment of the acetic acid by the vinyl acetate vapor while the reaction was continued at a temperature just below the boiling point of the reaction mixture for 3½ hours. The reaction mixture was then held at reflux for an additional ½ hour.

The reaction product was then neutralized and filtered in the same manner as the divinyl sebacate reaction product set forth in Example 1. The dry filter cake weighed 12 g.

A small amount of hydroquinone was then added to the reaction product and the reaction product distilled using a short-path distilling column to remove the solvents. The reaction product was distilled by warming it in an oil bath to 35–40° C. A vacuum was then applied to the reaction product and the pressure gradually lowered at such a rate that the low-boiling solvents distilled off smoothly and rapidly. The heating and lowering of the pressure continued until the residue was finally heated for 10 minutes at an oil bath temperature of 100–110° C. and at a pot temperature of 90° C. at 1 mm. The total time for the solvent removal was approximately 2 hours. The crude product weighed 141 g.

The crude methyl vinyl phthalate was then transferred to a smaller distillation flask and the pressure lowered to 1 mm. while the product was being heated. At the beginning of the distillation, the pot temperature was 100° C. at 1 mm. and the final pot temperature at 1mm. was 135° C. The methyl vinyl phthalate distillate obtained weighed 120 g. and was over 90% pure.

The weight of the distillation residue was 17.1 g. and contained most of the original mercury catalyst. The addition of 20% fresh makeup mercuric acetate was added and the residue was suitable for recycle for another run. The residue contained 2.8 g. crude methyl vinyl phthalate and about 5.3 g. methyl acid phthalate in addition to the mercury.

The methyl vinyl phthalate was then purified further by placing it in a round bottom flask fitted with a stirrer and a condenser together with 200 cc. of pentane and 50 cc. benzene. To the pentane solution, calcium hydroxide (3% of the weight of the crude ester) and water (1.5% of the weight of the crude ester) are added. This mixture was stirred for 1 hour at room temperature and the mixture then filtered through a coarse, sintered glass Buchner funnel. The filter cake was washed with small portions of pentane. The pentane was then distilled from the mixture. Most of the pentane distilled off at atmospheric pressure up to a still pot temperature of 60° C. The remaining pentane and benzene was removed by gradually reducing the pressure. The methyl vinyl phthalate was then subjected to a final distillation, using a short-path column. The resulting methyl vinyl phthalate had a boiling point of 103–106 at 1.5 mm., an iodine No. of 117.5–118 and an acid No. between 2.3 and 4.1. The yield of methyl vinyl phthalate based on methyl acid phthalate consumed was 83%. The conversion based on the starting methyl acid phthalate was 72%.

EXAMPLE 4

*Vinyl cyclohexane carboxylate*

Vinyl cyclohexane carboxylate was prepared by placing 390 ml. (4.2 moles) of vinyl acetate together with 2.8 g. of mercuric acetate in the reaction vessel. The mixture was stirred rapidly and 0.13 ml. of concentrated sulfuric acid was added to the mixture, one drop at a time. 89.8 g. (0.7 mole) of cyclohexane carboxylic acid were then added to the reaction mixture and the reaction mixture refluxed gently for 1 hour. Vinyl acetate vapor was distilled from a separate still pot and the vinyl acetate vapor passed through the reactants at such a rate that 500 ml. of distillate was collected approximately every 20 minutes. The vinyl acetate vapor was passed through the reaction mixture until eight cuts of 500 ml. were taken. The course of the reaction was followed by titrating the acetic acid in each cut. The total acetic acid removed from the reaction was 39.4 g. The vinyl acetate vapor was passed through the reaction mixture while maintaining it at a temperature just below its boiling point for 3½ hours. The reaction mixture was then held at reflux for ½ hour.

The reaction product was then neutralized with calcium hydroxide and filtered in the same manner as the reaction product in Example 2. The dried filter cake weighed 7 g. and contained 2.2% of the total mercury used in the original catalyst.

A small amount of hydroquinone was then added to the reaction product. The reaction product was then transferred to a short path distilling column and warmed to a temperature by means of an oil bath 35–40° C. A vacuum was applied and the pressure gradually lowered at such a rate that the low boiling components distilled off smoothly and rapidly. The heating and lowering of the pressure was continued until the residue was finally heated for 10 minutes in an oil bath temperature of 75° C. and a pot temperature of 55° C. at 20 mm. The total time for distilling off the solvent was about 2 hours.

The crude vinyl cyclohexane carboxylate was then purified by distilling it in a 16″ Vigreux distillation apparatus. The pressure was lowered to 10 mm. and the product heated. Distillation began at a pot temperature of 70° C. at 10 mm. and the final pot temperature was 100° C. at 10 mm. The vinyl cyclohexane carboxylate distillate weighed 78 g. The distillation residue weighed 13 g. and contained 95% of the mercury charged. 10% of fresh makeup mercuric acetate was added and the distillation residue was suitable for recycle for another run. The recycle distillation residue contained 3.2% crude vinyl cyclohexane carboxylate and 3% cyclohexane carboxylic acid in addition to the mercury.

A portion of the vinyl cyclohexane carboxylate distillate (72.5) was further purified by placing it in a round bottom flask fitted with a stirrer and a condenser, together with 150 cc. of pentane. Calcium hydroxide (3% of the weight of the crude ester) and water (1.5% of the weight of the crude ester) were added to the pentane solution and the mixture stirred for 1 hour at room temperature. The mixture was then filtered through a coarse, sintered glass Buchner funnel, and the filter cake washed with small portions of pentane. The pentane was then distilled from the reaction product. Most of the pentane was distilled from the reaction product at atmospheric pressure up to a pot temperature of 60° C. The remaining pentane was removed by gradually reducing the pressure. The recovered pure vinyl cyclohexane carboxylate weighed 63.5 g., had a boiling point of 69–71 at 10 mm., and an iodine No. of 161.6 and an acid No. less than 1.

EXAMPLE 5

Divinyl adipate

Divinyl adipate was prepared by placing 390 ml. (4.2 moles) of vinyl acetate together with 1.4 g. of mercuric acetate into the reaction flask. The mixture was stirred rapidly and 0.08 ml. of sulfuric acid was added to the mixture, one drop at a time. 51.3 g. (0.35 mole) of adipic acid was then added to the reaction vessel. The mixture was then gently refluxed for 1 hour. Vinyl acetate vapor distilled from a separate still pot was passed through the reaction mixture at such a rate that 500 ml. of distillate was collected at approximately every 20 minutes. The vinyl acetate vapor was passed through the reaction mixture until ten, 500 ml. cuts were taken. The course of the reaction was followed by titrating the acetic acid recovered in each cut. The total acetic acid recovered was 36 g. The vinyl acetate vapor was passed through the reaction mixture while being held at a temperature just below the boiling point of the reaction mixture for 3½ hours. The reaction mixture was then held at reflux for an additional ½ hour.

The reaction product was then neutralized with calcium hydroxide in the same manner as the divinyl sebacate reaction product in Example 1. The dried filter cake weighed 7.5 g.

A small amount of hydroquinone was then added to the reaction product. The reaction product was then distilled to remove the low boiling solvents by first warming it in an oil bath to 35–40° C. The pressure was then gradually lowered at such a rate that the low boiling components distilled off smoothly and rapidly. The heating and lowering of the pressure was continued until the residue was finally heated for 10 minutes in an oil bath temperature of 120–130° C. and a pot temperature of 110–120° C. at 15 mm.

The crude divinyl adipate was then transferred to a short path distillation apparatus. A vacuum was applied and the pressure lowered to 15 mm. while the oil bath was being heated. The distillate came over at a pot temperature of 132° C. and the final pot temperature was 155° C. The divinyl adipate distillate weighed 57.2 g. and was more than 96% pure, containing 2.0 g. acid. The conversion based on the amount of original adipic acid was 82% and the yield based on the amount of adipic acid consumed was 95%.

The distillation residue weighed 9.2 g. This residue also contained over 95% of the original mercury catalyst. The addition of 10% fresh makeup mercuric acetate rendered the residue suitable for recycle. The recycle residue composition contained 2.2 g. crude divinyl adipate and 3.0 g. adipic acid in addition to the mercury.

The divinyl adipate distillate was further purified by placing it into a round-bottom flask fitted with a stirrer and a condenser together with 63.4 g. or 100 ml. of pentane. Calcium hydroxide (3% of the weight of the crude ester) and water (1.5% of the weight of the crude ester) were added to the pentane solution. The mixture was stirred for 1 hour at room temperature, filtered through a coarse, sintered glass Buchner funnel, and the filter cake washed with small portions of pentane. The pentane was then distilled from the reaction product. Most of the pentane was distilled from the reaction product at atmospheric pressure up to a pot temperature of 80° C. The remaining pentane was removed by gradually reducing the pressure to give 54.8 g. divinyl adipate, 97.5% pure. The divinyl adipate can be then subjected to further purification by distilling it with a short-path distillation apparatus. The recovered pure divinyl adipate has a boiling point of 126–130° C. at 15 mm., and iodine No. of 254–256.4, an acid number of less than 1, and contained less than 0.01% mercury.

EXAMPLE 6

Vinyl toluate

Vinyl toluate was prepared by placing into the reaction vessel 390 ml. (4.2 moles) of vinyl acetate together with 2.8 g. of mercuric acetate. The mixture was stirred while adding 0.15 ml. of concentrated sulfuric acid one drop at a time. 95.2 g. (0.7 mole) of toluic acid were then added to the reaction mixture and the reaction mixture pre-reacted to substantial equilibrium by refluxing the reaction mixture for 1½ hours. Vinyl acetate was then distilled from the separate still pot and passed through the reaction mixture until 10 cuts of 500 ml. were taken. The total entrainment time was 2¾ hours. The temperature of the reaction during the entrainment was maintained just below the boiling point of the reaction mixture. The reaction mixture was then further held at reflux temperature for ½ hour.

The reaction mixture was then neutralized and filtered in the same manner as the reaction product in Example 2. The dried residue weighed 4.7 g. and contained 3.3% of the total mercury used in the original catalyst.

The vinyl acetate solvent, together with remaining acetic acid, was then stripped off by distillation using a short-path distillation column. The mixture was warmed by means of an oil bath to 35–40° C. Vacuum was then applied to the reaction product and the pressure gradually lowered at such a rate that the low-boiling components distilled off smoothly and rapidly. The heating and lowering of the pressure was continued until the residue reached a temperature of 70° C. at 10 mm. pressure at which time the distillation was complete.

The crude divinyl toluate weighed 113 g. and was further purified by distilling it in a short-column distillation apparatus. The distillation was carried out under reduced pressure. The pure vinyl toluate weighed 93.3 g. The conversion was 80%. The pure vinyl toluate product had an iodine No. of 153.1, and acid No. of 14.7 and contained less than 0.1% mercury. The vinyl toluate was 97.3% pure. The yield was in excess of 90%.

EXAMPLE 7

Vinyl stearate—vinyl palmitate 390 ml. (4.2 moles) of vinyl acetate were placed in the reaction vessel together with 2.8 g. (0.0087 mole) of mercuric acetate. 0.13 ml. (0.0024 mole) of concentrated sulfuric acid was slowly added to the reaction vessel at the rate of 1 drop per second while continuously stirring the mixture. 200 g. of a mixed carboxylic acid comprising 45% stearic acid and 55% palmitic acid were then added to the mixture and the reaction mixture heated at a reflux temperature for one hour. At the end of this time, vinyl acetate vapor formed from the separate still pot was passed or bubbled through the reaction mixture by means of the tube extending into the reaction mixture. The vinyl acetate vapor was passed through the reaction mixture at the rate of 500 ml. every 18 minutes for 3½ hours and the vinyl acetate vapor entraining the acetic acid removed therefrom and collected. The vinyl acetate was separated from the entrained acetic acid. 44.7 g. of acetic acid were recovered. The reaction mixture was then held at reflux for an additional ½ hour.

The mixed vinyl ester product was then neutralized and filtered in the same manner as the reaction product in Example 2. The dried residue weighed 8.5 g. and contained less than 2% of the original mercury used in the catalyst.

The vinyl acetate, together with a small amount of acetic acid remaining, was then stripped off by distillation by placing the reaction product in a still pot having a short distillation path and heated by an oil bath. The reaction product was heated to a temperature between 25–35° C. Vacuum was then applied and the pressure gradually lowered so that the mixture boiled rapidly without splashing or foaming. When the pressure was lowered to 1 mm., the oil bath was heated to 110° C. and the heating discontinued. From the time the pot temperature reached 95° C., heating and pumping were continued for 15 minutes until the reaction product had been stripped of vinyl acetate and other volatiles. The vacuum was then slowly released and the vinyl acetate collected for recycle.

The crude mixed vinyl ester product weighed 219 g., had an iodine number of 81, an acid number of 9.1 and contained 0.6% mercury.

The crude mixed vinyl ester was then purified by dissolving it in 209 g. of pentane. The pentane solution of the mixed vinyl ester was then passed through an adsorptive column containing 10% by weight magnesium oxide (Sea Sorb), 10% by weight magnesium silicate (Magnesol) and 2% by weight activated carbon (Nuchar-C190N) in the order named from the top down. The three adsorbents were placed in the column as pentane slurries. The pentane solution of the mixed vinyl ester product was passed through the adsorptive column at a rate of about 5 ml. per minute. The pentane was then distilled off. Most of the pentane was distilled off at atmospheric pressure and the remainder under reduced pressure.

The final mixed vinyl ester product weighed 176 g. had an iodine number of 86.5 and an acid number of 3.1 and exhibited excellent polymerization properties.

EXAMPLE 8

*Methyl vinyl succinate*

Methyl vinyl succinate was prepared by placing 195 ml. (2.1 moles) of vinyl acetate in the reaction flask together with 2.8 g. of mercuric acetate. The mixture was stirred rapidly and 0.13 ml. of concentrated sulfuric acid was added to the mixture, one drop at a time, from a 1 ml. pipette. 92.4 g. (0.7 mole) of methyl acid succinate containing 195 ml. (2.1 moles) of vinyl acetate was then added to the reaction flask. The molar ratio of vinyl acetate to methyl acid succinate was 6:1. The reaction mixture was refluxed gently for one hour. Vinyl acetate vapor was then distilled from a separate still pot and the vinyl acetate vapor passed through the reactants at such a rate that 500 ml. of distillate was collected at approximately every 20 minutes. The vinyl acetate vapor was passed through the reaction mixture until ten, 500 ml. cuts were taken. The course of the reaction was followed by titrating the acetic acid in each cut. The vinyl acetate vapor was continuously passed through the reaction mixture while the reaction mixture was maintained at a temperature just below the lowest boiling component for over 3½ hours. The reaction mixture was then held at reflux for an additional ½ hour.

The reaction product was then neutralized and filtered in the same manner as the divinyl sebacate reaction product in Example 2. The dried filter cake weighed 8 g.

A small amount of hydroquinone was then added to the reaction product and the reaction product distilled using a short path distilling column. The reaction product was distilled by warming the mixture by means of an oil bath to 30–40° C. A vacuum was applied to the reaction product and the pressure gradually lowered at such a rate that the low boiling components distilled off smoothly and rapidly. The heating and lowering of the pressure was continued until the residue was finally heated for 10 minutes at an oil bath temperature of 76° C. and a pot temperature of 45° C. at 10 mm.

The crude methyl vinyl succinate was then transferred to a smaller distillation flask and distilled by lowering the pressure to 10 mm., using a 16" Vigreux. At the beginning of the distillation, the initial pot temperature was 92° C. and the final pot temperature 120° C. The methyl vinyl succinate obtained weighed 89 g.

The weight of the distillation residue was 16 g. The residue contained most of the original mercury catalyst, and was suitable for recycle for another run, and contained in addition to the mercury about 2 g. of crude methyl vinyl succinate and about 10.2 g. of methyl acid succinate. The 89 g. of crude methyl vinyl succinate was combined with an additional 54 g. of crude methyl vinyl succinate obtained in the same manner and was further purified by placing it in a round bottom flask fitted with a stirrer and condenser together with 280 cc. of pentane. Calcium hydroxide (3% of the total weight of the crude ester) and water (1.5% of the total weight of the crude ester) were then added to the pentane solution. The mixture was stirred for one hour at room temperature and then filtered through a coarse, sintered glass Buchner funnel. The filter cake was washed with small portions of pentane. The pentane was then distilled from the reaction product. Most of the pentane was distilled from the reaction product at atmospheric pressure up to a pot temperature of 60° C. The remaining pentane was removed by reducing the pressure gradually. The methyl vinyl succinate was then subjected to a final distillation, using a 16" Vigreux column. The resulting pure methyl vinyl succinate had a boiling point of 86–87 at 10 mm. and iodine number of 155.3 and an acid number of 9.8. The conversion calculated on the basis of the 89 g. of methyl vinyl succinate obtained above and based on the starting methyl acid succinate was 71.3% and the yield was 77.8%.

n-Butyl vinyl succinate was prepared in the same manner as the methyl vinyl succinate. 121.5 g. (0.7 mole) of n-Butyl acid succinate together with 390 ml. (4.2 moles) of vinyl acetate were used to form the original reaction mixture. After neutralization of the reaction product as above, the low boiling solvents were removed from the n-Butyl vinyl succinate product in the same manner, except that the oil bath temperature was 80° C., the pot temperature 60° C. at 5 mm. In the purification of the crude n-Butyl vinyl succinate by distillation, the pressure was lowered to 1–2 mm. and at the beginning of the distillation, the pot temperature was 84° C. and at the end the final pot temperature 115° C. The weight of the n-Butyl vinyl succinate distillate was 124 g. and the weight of the distillation residue was 16.5 g. The n-Butyl vinyl succinate obtained as above, when further purified in the same manner, had a boiling point of 86–89 at 2.5 mm., an iodine number of 122–127 and an acid number of 1.9. The conversion based on the amount of original n-Butyl succinate was about 70% and the yield of n-Butyl acid succinate obtained was about 83%.

EXAMPLE 9

*Vinyl pelargonate*

390 ml. of vinyl acetate (4.2 moles) and 2.8 g. of mercuric acetate were placed in the reaction vessel, and 0.13 ml. of concentrated sulfuric acid was added dropwise, during which time the mixture was thoroughly stirred. After adding 110.7 g. of pelargonic acid (0.7 mole) to the reaction vessel, the mixture was heated at reflux for approximately 2 hours.

Vinyl acetate vapor, distilled from the separate still pot, was passed through the reaction mixture at such a rate that 500 ml. of distillate was collected every 18 minutes. By titrating the entrained acetic acid contained in the vinyl acetate distillate, the course of the transvinylation could be followed. During the acetic acid entrainment, the reaction temperature was maintained immediately below the boiling point of the reaction mixture. After 44.5 g. of acetic acid had been removed by entrainment, the reaction mixture was held at reflux temperature for an additional ½ hour.

A slurry of 0.8 g. of calcium hydroxide in 5 ml. of vinyl acetate was then added to neutralize the reaction product. During the neutralization, the reaction product was continuously stirred for ½ hour and maintained at a temperature of about 60° C. During neutralization 20 g. copper dust was added to inhibit polymerization. Following neutralization, the mixture was filtered through a coarse, sintered glass Buchner funnel, prepared with a mat of 5 g. of Filter Cel, filter aid, using fresh vinyl acetate to wash the residue.

The filtrate, containing crude vinyl pelargonate, was distilled under vacuum through a short Vigreux column, using a small amount of powdered copper in the distillation pot as a polymerization inhibitor. Vinyl pelargonate, $n_D^{20}$ 1.4330, distilled at 53–56° C. at 0.5 mm. and was obtained in 92.6% yield. On analysis, the product corresponded to a 99.7% pure vinyl pelargonate, and had an iodine number of 137.1, an acid number of less than 1, and no detectable mercury. The vinyl pelargonate represented a conversion of 92.5%.

EXAMPLE 10

*Vinyl oleate*

390 ml. (4.2 moles) of vinyl acetate were placed in the reaction vessel together with 2.8 g. of mercuric acetate. While continuously stirring the mixture, 0.13 ml. (0.0024 mole) of concentrated sulfuric acid was slowly added to the reaction vessel at the rate of one drop per second. After adding 198 g. (0.7 mole) of oleic acid, the reaction mixture was heated at reflux temperature for 1 hour. At the end of this time, vinyl acetate vapor formed from the separate still pot was bubbled through the reaction mixture through the tube extending into the reaction mixture. The vinyl acetate vapor was passed through the reaction mixture at the rate of 500 ml. every 18 minutes for approximately 2½ hours and the vinyl acetate vapor entraining the acetic acid removed therefrom and collected. After removing 42 g. of acetic acid by entrainment, the reaction mixture was held at reflux for an additional ½ hour.

The crude vinyl oleate was then neutralized and filtered in the same manner as the reaction product in Example 2. Vinyl acetate, together with a small amount of acetic acid remaining, was then stripped off by distillation by placing the reaction product in a still pot having a short distillation path and heated by an oil bath. The reaction product was heated to a temperature between 25–30° C., and the pressure gradually lowered so that the mixture boiled rapidly without splashing or foaming. When the pressure had been lowered to 1 mm., the temperature of the oil bath was raised to 110° C. and the heating then discontinued. After the pot temperature had reached about 95° C., the vacuum was continued for an additional 15 minutes until the reaction product had been stripped of vinyl acetate and other volatiles. The vacuum was then slowly released and the vinyl acetate collected for recycle.

The crude vinyl oleate weighed 217.4 g. and represented a conversion of 97%.

The crude product was distilled under reduced pressure through a short column, and the fraction distilling between 135°–173° C. at 1 mm. collected, yielding 195 g. of vinyl oleate. Analysis of the distillate indicated an iodine number of 159.8 and an acid number of 4.5, which corresponded to 97% of vinyl oleate together with 2.5% of oleic acid. The distillate represented a 90.3% conversion to vinyl oleate.

Removal of the acid impurities was accomplished by dissolving 195 g. of the vinyl oleate distillate in 430 ml. of pentane, and then adding 5.8 g. of calcium hydroxide and 2.9 ml. of distilled water to the pentane solution. After stirring the mixture for one hour, it was filtered and pentane stripped under vacuum from the filtrate, yielding 186 g. of vinyl oleate having an iodine number of 160.9 and an acid number of less than 0.1, which corresponded to a purity of 97.8% and a conversion of 86.0%.

We claim:

1. The method of making vinyl esters by vinyl interchange reaction which comprises reacting with heat a carboxylic acid together with a vinyl ester reactant in the presence of a mercury ester interchange catalyst to form the corresponding vinyl ester of the carboxylic acid and the corresponding by-product acid of the vinyl ester reactant, removing the by-product acid from the reaction medium by entraining it in the vapor of the vinyl ester reactant and continuing the vinyl interchange reaction between the carboxylic acid and the vinyl ester reactant until substantially complete.

2. The method of making vinyl esters by vinyl interchange reaction which comprises reacting with heat a carboxylic acid and a vinyl ester reactant in the presence of a mercury ester interchange catalyst to form the corresponding vinyl ester of the carboxylic acid and the corresponding by-product acid of the vinyl ester reactant, passing vinyl ester reactant vapor through the reaction mixture to entrain the by-product acid, removing the entrained by-product acid from the reaction mixture, and continuing the vinyl interchange reaction between the carboxylic acid and the vinyl ester reactant until substantially complete.

3. The method of making vinyl esters by vinyl interchange reaction which comprises pre-reacting with heat a carboxylic acid and a vinyl ester reactant in the presence of a mercury ester interchange catalyst to substantial equilibrium to form a reaction mixture containing the corresponding vinyl ester of the carboxylic acid and the corresponding by-product acid of the vinyl ester reactant, then removing the by-product acid from the reaction mixture by entraining it in the vinyl ester reactant vapor and continuing the vinyl interchange reaction between the carboxylic acid and the vinyl ester reactant until substantially complete.

4. The method of making vinyl esters by vinyl interchange reaction between a carboxylic acid and a vinyl ester reactant in the presence of a mercury ester interchange catalyst which comprises passing a mixture of a carboxylic acid, a vinyl ester reactant and a mercury ester interchange catalyst downwardly through a reaction zone heated to the vinyl interchange reaction temperature to form the vinyl ester of the carboxylic acid and the corresponding by-product acid of the vinyl ester reactant, simultaneously passing the vapor of the vinyl ester reactant upwardly through the reaction zone in the form of small bubbles to remove the by-product acid out of the reaction column.

5. The method of making vinyl esters by vinyl interchange reaction between a carboxylic acid and a vinyl ester reactant in the presence of a mercury ester interchange catalyst which comprises heating a mixture of a carboxylic acid and a vinyl ester in the presence of a mercury ester interchange catalyst to form a reaction mixture which is substantially at equilibrium and containing the vinyl ester reaction product of the carboxylic acid and the corresponding by-product acid of the vinyl ester reactant, passing the reaction mixture downwardly through a reaction zone heated to the vinyl interchange reaction temperature, simultaneously passing the vapor of the vinyl ester reactant upwardly through the reaction zone in the form of small bubbles to remove the by-product acid of the vinyl ester reactant by entrainment, and removing the entrained by-product from the reaction column.

6. The method of making vinyl esters by vinyl interchange reaction between a carboxylic acid and a vinyl ester in the presence of a mercury ester interchange catalyst which comprises heating a mixture of a carboxylic acid and a vinyl ester reactant in the presence of a mercury ester interchange catalyst to form a reaction mixture which is substantially at equilibrium and containing the vinyl ester reaction product of the carboxylic acid and the corresponding by-product acid of the vinyl ester reactant, passing the reaction mixture downwardly through a reaction zone heated to the vinyl interchange reaction temperature, simultaneously passing the vapor of the vinyl ester reactant upwardly through the reaction zone to remove the by-product acid by entrainment, removing the by-product acid entrained in the vinyl ester reactant vapor together with the vinyl ester reactant vapor from the reaction column, separating the entrained by-product acid from the vinyl ester reactant vapor, recycling the separated vinyl ester vapor to the bottom of the reaction zone to supply the vinyl ester reactant vapor for removing additional by-product acid, heating the recycled vinyl ester vapors before they enter the bottom of the reaction zone to maintain the reaction temperature of the reaction zone, and recovering the vinyl ester reaction product substantially free of by-product acid at the bottom of the reaction zone.

7. The method of claim 6 in which the vinyl ester is vinyl acetate.

8. The method of making vinyl esters by vinyl interchange reaction between a carboxylic acid and a vinyl ester in the presence of a mercury ester interchange catalyst which comprises heating a mixture of a carboxylic acid and a vinyl ester reactant in the presence of a mercury ester interchange catalyst to form a reaction mixture which is substantially at equilibrium containing the vinyl ester reaction product of the carboxylic acid and the corresponding by-product acid of the vinyl ester reactant, passing the reaction mixture downwardly through a reaction zone heated to the vinyl interchange reaction temperature, simultaneously passing the vapor of the vinyl ester reactant upwardly through the reaction zone in the form of small bubbles to remove the acid by-product by entrainment, removing the by-product acid entrained in the vinyl ester reactant vapor together with the vinyl ester vapor from the zone, passing the entrained by-product acid to a distillation zone, distilling off the vinyl ester reactant vapor to separate the by-product acid from the vinyl ester reactant vapor, splitting the distilled vinyl ester vapor, refluxing one split to condense the vinyl ester vapor and returning the condensed vinyl ester vapor to the distillation zone, recycling the other split to the bottom of the reaction zone to supply the vinyl ester reactant vapor for entraining the by-product acid and to maintain the desired ratio of the carboxylic acid and vinyl ester reactant, heating the recycled vinyl ester reactant vapor before it enters the reaction zone to maintain the reaction temperature of the column, and recovering the vinyl ester reaction product substantially free from by-product acid at the bottom of the reaction zone.

9. The method of making vinyl esters by vinyl interchange reaction between a carboxylic acid and a vinyl ester reactant which comprises reacting with heat a carboxylic acid and a vinyl ester reactant in the presence of a mercury ester interchange catalyst to form a reaction mixture containing the vinyl ester reaction product of the carboxylic acid and the corresponding by-product acid of the vinyl ester reactant, passing vinyl ester reactant vapor through the reaction mixture to entrain the by-product acid, removing the entrained by-product acid and vinyl ester reactant vapor from the reaction mixture and passing it to a distillation zone, distilling the entrained by-product acid and vinyl ester reactant vapor to separate the vinyl ester reactant vapor therefrom, splitting the vinyl ester distillate, refluxing one split to condense the vinyl ester vapor and returning the condensed vinyl ester vapor to the distillation zone, and recycling the other split to the reaction mixture to supply the vinyl ester reactant vapor for entraining the by-product acid.

10. The method of making an aliphatic monovinyl ester which comprises reacting with heat, a vinyl ester reactant and an aliphatic monocarboxylic acid in the presence of a mercuric salt-acid catalyst in which the amount of acid catalyst is equivalent to less than about 0.0046 mol of concentrated sulfuric acid for every mol of the aliphatic monocarboxylic acid and in which the by-product acid is removed from the reaction mixture and the reaction continued until it is substantially complete.

11. The method of forming vinyl esters of aliphatic monocarboxylic acids by vinyl interchange reaction which comprises reacting with heat an aliphatic monocarboxylic acid and a vinyl ester reactant in the presence of a mercury salt-sulfuric acid catalyst in which the total amount of sulfuric acid is less than about 0.0046 mol for every mol of the aliphatic monocarboxylic acid to form a reaction mixture containing the corresponding vinyl ester of the aliphatic monocarboxylic acid and the corresponding by-product acid of the vinyl ester reactant, removing the by-product acid from the reaction mixture and continuing the reaction until it is substantially complete.

12. The method of claim 11 in which the reaction is permitted to reach substantial equilibrium before the removal of the by-product acid is begun.

13. The method of claim 12 in which the by-product acid is removed by entraining it in the vapor of the vinyl ester reactant.

14. The method of making vinyl esters by vinyl interchange reaction which comprises reacting with heat a carboxylic acid together with a vinyl ester reactant in the presence of a mercury ester interchange catalyst to form the corresponding vinyl ester of the carboxylic acid and the corresponding by-product acid of the vinyl ester reactant, removing the by-product acid from the reaction medium by entraining it in the vapor of the vinyl ester reactant, continuing the vinyl interchange reaction between the carboxylic acid and the vinyl ester reactant until it is substantially complete to form a crude reaction product containing the vinyl ester product, unreacted vinyl ester reactant, unreacted carboxylic acid, catalyst and other impurities, neutralizing the crude reaction product, stripping the vinyl ester reactant from the crude reaction product, and purifying the crude reaction product by distillation, and recovering the purified vinyl ester product.

References Cited in the file of this patent

UNITED STATES PATENTS

| 1,433,308 | Steffens | Oct. 24, 1922 |
| 1,891,402 | Craise et al. | Dec. 20, 1932 |
| 1,930,572 | Wait | Oct. 17, 1933 |
| 2,177,473 | Brant | Oct. 24, 1939 |
| 2,299,862 | Toussaint et al. | Oct. 27, 1942 |
| 2,586,860 | Port et al. | Feb. 26, 1952 |
| 2,642,389 | Cohen et al. | June 16, 1953 |

FOREIGN PATENTS

| 654,471 | Great Britain | June 20, 1951 |
| 686,050 | Great Britain | Jan. 14, 1953 |

OTHER REFERENCES

Groggins: Unit Processes in Organic Syntheses, 4th ed., 1952, page 620.